Figure 2:
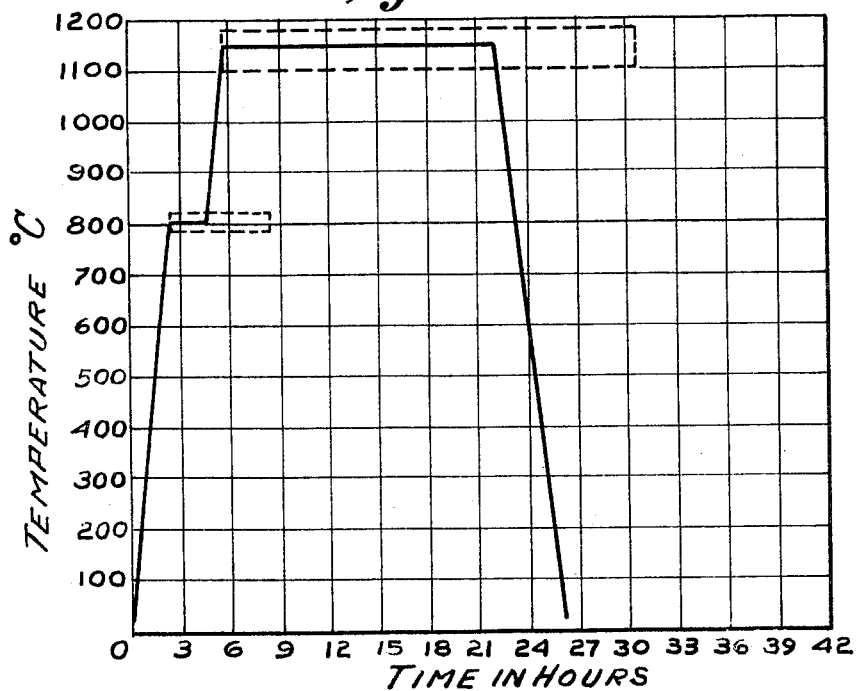

Sept. 13, 1966  R. A. EPPLER ETAL  3,272,610
METHOD OF MAKING HIGH STRENGTH DEVITRIFIED GLASS BODIES
Filed Aug. 8, 1962

INVENTORS
RICHARD A. EPPLER
AND JOHN F. MACDOWELL
BY
Clarence R. Patty Jr.
ATTORNEY 3,272,610
METHOD OF MAKING HIGH STRENGTH
DEVITRIFIED GLASS BODIES
Richard A. Eppler, Corning, and John F. MacDowell, Painted Post, N.Y., assignors to Corning Glass Works, Corning, N.Y., a corporation of New York
Filed Aug. 8, 1962, Ser. No. 215,609
2 Claims. (Cl. 65—33)

This invention relates to the manufacture of dinnerware. More particularly, this invention relates to the manufacture of glass-ceramic bodies which are eminently suitable for use as dinnerware.

United States Patent No. 2,920,971, issued to Stanley D. Stookey, explains in detail the general concepts and means of production of glass-ceramic or semicrystalline ceramic articles. Broadly speaking, the process comprehends the controlled crystallization of a glass body in situ through a particular heat treating schedule. A glass-forming batch, to which a nucleating or crystallization-promoting agent is frequently added, is melted and the melt then cooled and shaped into a glass body. Thereafter, this glass article is subjected to a specific time-temperature cycle whereby it is converted into a body composed of fine-grained crystals randomly oriented and substantially uniformly dispersed throughout a glassy matrix, the crystals comprising the major portion of the body and the glassy matrix consisting essentially of the uncrystallized portion of the glass remaining after crystallization has occurred.

The development of crystallization causes extensive changes in the physical properties and appearance of the original glass. The hardness, strength, and, often, the resistance to thermal shock of these bodies are substantially superior to those of the base glass. The crystalline constitution of these bodies generally results in their being opaque or translucent and having a much higher softening or deformation point than the original glass. The method of making these semicrystalline ceramic bodies, i.e., through the crystallization of a glass in situ, endows an added advantage to these products. As the articles are first a glass, they can be formed into desired shapes by using any of the conventional glass-forming methods such as blowing, drawing, casting, pressing, or spinning. Finally, as the crystallization of the glass occurs in situ, a substantially homogeneous body of fine-grained crystals which is essentially free of voids and non-porous can be manufactured.

Glass-ceramic articles have been used in space vehicles, electrical and thermal insulators, dinnerware, and cooking ware. Because of the obvious enormous potential market for dinnerware, research has been constant to develop products which would gain wide consumer acceptance. Within the dinnerware field, two broad classifications of product are commonly made. There is the individual or home consumer and the institutional consumer, e.g., restaurants, hospitals, hotels, and the like, and even the armed services. The normal institutional user is aware that its patrons and employees will not exercise as much care in handling dinnerware as will the home consumer. Therefore, institutions are vitally interested in products having very high mechanical and thermal strengths and are often willing to sacrifice aesthetic appearance to obtain these properties.

In the co-pending application Ser. No. 211,794 by John F. MacDowell, one of the co-inventors herein, is described the manufacture of glass-ceramic dinnerware from compositions in the $Na_2O \cdot BaO \cdot Al_2O_3 \cdot SiO_2 \cdot TiO_2$ system, which is particularly suitable for the home consumer in that the ware possesses satisfactory physical properties coupled with an appearance and feel very similar to that of fine china. This invention is directed toward the manufacture of dinnerware of such high mechanical strength and good resistance to thermal shock as to be eminently useful as institutional ware.

Extensive laboratory and field testing have demonstrated that a modulus of rupture of at least about 30,000 p.s.i. is desirable in obtaining satisfactory resistance to breakage and chipping while handling, and a linear coefficient of thermal expansion of about $70 \times 10^{-7}/°$ C. and less is to be desired to guard against thermal breakage and cracking. These two properties must be combined with good resistance to staining by food products, good resistance to attack by acids and bases in foods and cleaning detergents (chemical durability), and a reasonable simulation of the appearance and feel of fine china. The visible and tactile qualities of fine china are due, in part at least, to a glaze which is applied thereon. Hence, the semicrystalline ceramic body must be capable of accepting and retaining glazes of many varieties such that the ware can be decorated as desired.

Therefore, the principal object of this invention is to provide glass-ceramic bodies possessing a modulus of rupture of at least about 30,000 p.s.i., a linear coefficient of thermal expansion of not more than about $70 \times 10^{-7}/°$ C., a good resistance to staining by food products, good chemical durability, good compatibility to glazes, and yet having a reasonable likeness to the appearance and feel of fine china.

Another object of this invention is to provide glass-ceramic articles which eminently are suitable for use as institutional dinnerware.

Still another object of this invention is to provide a method of manufacturing a glass-ceramic body suitable for use as institutional dinnerware which is relatively simple in operation and economical in practice.

We have learned that a very limited range of glass compositions in the $BaO \cdot MgO \cdot Al_2O_3 \cdot SiO_2 \cdot TiO_2$ system will accomplish these objects. Thus, when glass bodies consisting essentially, by weight, of about 16–19.5% BaO, 7–10% MgO, 16.5–19% $Al_2O_3$, 46–49% $SiO_2$, and 6–12% $TiO_2$, the sum of these constituents totalling at least about 95%, are subjected to a specific heat treating process, they are crystallized in situ into glass-ceramic articles possessing the physical properties, visible appearance, and surface feel which make them particularly desirable for use as institutional ware.

This invention contemplates the use of titania ($TiO_2$) as a nucleating or crystallization-promoting agent. The use of $TiO_2$ as a nucleating agent for semicrystalline ceramic products is disclosed in the aforementioned patent issued to Stookey, 2,920,971. This patent teaches the substantially unlimited ability of this compound to nucleate glass compositions during a heat treating sequence. This patent provides a valuable reference work on the concepts and mechanisms involved in the manufacture of glass-ceramics and discusses in considerable detail the relationship of the semicrystalline body to the original glass and the variations in physical properties of one to the other. Stookey discloses that three factors are most important in determining the physical properties and other characteristics of glass-ceramic articles: (1) the composition of the original glass; (2) the heat treatment to which the article is subjected; and (3) the crystalline phase or phases which are crystallized in situ during the heat treating process. The first two factors resolve the structure and quantity of the crystalline phase or phases formed while the identity of the crystalline phase or phases directly determines the physical attributes and characteristics of the article.

We have discovered that semicrystalline ceramic bodies derived from the glass compositions of our invention contain hexacelsian ($BaO \cdot Al_2O_3 \cdot 2SiO_2$) as the primary base.

A very minor phase of magnesium dititanate and traces of a phase which we have not been able to identify are also sometimes present. This latter phase is unknown in that its X-ray diffraction pattern matches no recognized crystal structure. However, it is unequivocally characterized by a strong X-ray diffraction peak at 7.2 A. The Stookey patent discussed hereinabove does not teach the advantages of crystallizing hexacelsian in situ in a glass body nor, indeed, does the patent even teach the possibility of crystallization of hexacelsian in situ in a glass body. The crystallization of hexacelsian is also disclosed in the above-mentioned co-pending MacDowell application, Ser. No. 211,794, now U.S. Patent No. 3,201,266, wherein it was precipitated in combination with nepheline. Such bodies, although of adequate mechanical strength and thermal shock resistance for individual consumer ware and possessing an appearance and feel very similar to that of fine china, did not exhibit as high mechanical strength, i.e., at least about 30,000 p.s.i. or thermal shock resistance, i.e., a linear coefficient of thermal expansion of not more than $70 \times 10^{-7}/°$ C., as laboratory and field tests had demonstrated was demanded for institutional dinnerware. Therefore, the present invention is designed to furnish a glass-ceramic body of the required strength and resistance to thermal shock for use as institutional dinnerware while manifesting a sound resemblance to fine china.

Not only must the composition ranges of the glasses of our invention be severely limited, but we have also learned that the heat treatment schedule for these glass bodies is extremely critical. Thus, our method of manufacture in its preferred embodiment comprises melting a glass-forming batch containing the necessary components, simultaneously shaping and cooling the melt to a temperature below the transformation point, i.e., the temperature at which a liquid melt is deemed to have become an amorphous solid, this temperature being in the vicinity of the annealing point of the glass (about 700°–725° C. for glasses of this invention), after which the temperature of the body is raised to about 780°–820° C., maintained thereat for a time sufficient to initiate nucleation of the crystalline phases, the temperature of the body is then raised to about 1100°–1175° C., maintained thereat for a period of time sufficient to attain the desired crystallization, and thereafter the body is cooled to room temperature. In this two-step heat treating sequence, the dwell time at the nucleation temperature generally ranges from 1–6 hours, with about 2 hours at 800° C. being the preferred time, while the dwell time at the crystallization temperature suitably ranges from about 2–24 hours, with about 16 hours at 1150° C. being the preferred. Longer holding periods at each temperature level have been successfully employed, but no advantage has been perceived in so doing.

Although the above method comprises our preferred embodiment, we have discovered that satisfactorily crystallized bodies can be produced where the temperature of the body is raised at a gradual, but substantially constant rate, from below the transformation point to a temperature within the 1100°–1175° C. range and held thereat for a period of time sufficient to attain the desired crystallization and then cooling the body to room temperature.

Where inspection and decoration of the glass articles before heat treating are customarily practiced, the articles will be cooled to room temperature before heat treatment. However, where these processes are excluded or are unnecessary, fuel economies can be enjoyed by merely cooling the glass articles to just below the transformation point and then beginning the heat treating sequence immediately.

The rate of heating glass bodies to the transformation temperature is dependent upon two principal factors: (1) the coefficient of thermal expansion of the glass; and (2) the size and shape of the article itself. The glass articles of this invention are commonly heated at the rate of about 5° C./minute. This rate of heating has been selected after considerable experimentation in the desire to protect the glass from thermal shock and deformation. Much more rapid rates have been used successfully with thin-walled shapes, but the 5° C./minute rate has produced sound bodies in substantially all instances.

The rate of heating glass bodies above the transformation point is mainly dependent upon the speed of crystallization occurring within the body. As was explained hereinabove, the glass body is first heated to just above the transformation point to initiate crystallization after which the body is then raised to a higher temperature to expedite and increase crystallization. Crystallization occurs more rapidly as the temperature of the body approaches the liquid of the crystal phases. But when the glass article is heated above the transformation temperature, softening and deformation of the glass occurs. However, the softening point, and, therefore, the deformation temperature of the glass-ceramic article is substantially higher than the original glass. Thus, when the rate of heating the glass body is balanced against the rate at which crystals are formed within the body, deformation will not be a problem. In the beginning stages of crystallization, the proportion of glassy matrix is very large and too rapid heating will not allow the formation of sufficient crystals to support the body and slumping can occur. Therefore, the holding period at the nucleation temperature set forth in our preferred embodiment is valuable in assuring the development of an adequate number of crystals to support the article as the temperature is raised to the higher temperature range of crystallization.

Where a two-step heat treating cycle is employed, we have found that the glass bodies can be heated above the nucleation temperature range at a rate of 5° C./minute without fear of deformation in most instances. With thin-walled articles, much faster heating rates can be used successfully. Heating rates slower than 5° C./minute also yield excellent bodies but, in actual production, more rapid rates are preferred as this enables the faster manufacture of completed articles.

When the preferred two-step heat treating schedule is not employed but crystallization is produced through a gradual, but relatively constant, increase in temperature above transformation point, we have learned that this increase in temperature should be not more than about 3° C./minute. We have discovered that crystallization is quite low at temperatures around the nucleation range, and even as high as 1025° C. Therefore, unless the rate of heating is very gradual, the amount of crystallization formed will not support the body and slumping will occur. With large bodies, rates of 1°–2° C./minute or even slower may be required. This very slow rate of crystallization, even at relatively elevated temperatures, has virtually limited actual production of these bodies to the two-step process in that the holding period at the nucleation temperature is a safety factor that is dangerous to ignore.

The rate of cooling the glass-ceramic article to room temperature is contingent upon the coefficient of thermal expansion and the physical size and shape of the article. A cooling rate of 5° C./minute has yielded sound bodies in all instances and rates of 10° C./minute and higher have been used successfully with relatively small articles. In many instances, the source of heat in the heat treating furnace is merely cut off and the furnace allowed to cool at its own rate. As is the case with the heating rate, production personnel desire to use as rapid a cooling rate as is possible with the material involved.

The method of our invention, then, in its broadest terms consists of melting a specific glass-forming batch, simultaneously quenching the melt below the transformation point and shaping it into a glass body, exposing the glass body to a temperature of about 1100°–1175° C. for a time sufficient to attain the desired crystallization, and then cooling the semicrystalline body to room temperature. Although exposure times considerably longer than 24 hours have yielded very satisfactory products, we have learned that such extended periods are unnecessary. We have discovered that an exposure of from 2–24 hours, with 16 hours being preferred, provides bodies having the demanded high strength and thermal shock resistance in conjunction with the other properties desired in institutional dinnerware.

As stated above, the compositional limits of the glass-forming batch ingredients are vital to the invention. At least 6% titania must be present to function as the nucleating agent and to insure a dense, fine-grained crystallization. Although, in some instances, the use of more than 12% $TiO_2$ has yielded satisfactory products, the overall stability of the glass is seriously affected, i.e., it becomes very difficult to cool the melted batch to a glass shape with no devitrification. In actual production, the preferred amount is about 8–10%. This amount is sufficiently above the 6% minimum to assure a uniform product through possible production variations. $TiO_2$ is a relatively expensive batch material and economics demands the use of the minimum amount of this expensive ingredient commensurate with the securing of a satisfactory product. This, then, is another factor limiting the responsible use of $TiO_2$ to 12%. The other four components must be present in the amounts specified only in order to form hexacelsian and attain the high strength and thermal shock resistance desired, as will be observed hereinafter. A further reason for strictly controlling the amounts of these four constituents is to prevent the crystallization of incompatible phases. This incompatibility may consist of large differences in the coefficients of thermal expansion between the hexacelsian and of an extraneous phase, such that the body will be disrupted during the heat treatment. Also, this incompatibility may concern the development of large crystals of an extraneous phase during heat treatment so that the desired dense, fine-grained structure is not formed.

Other compatible metal oxides may be present in the glass composition provided their total amount does not exceed about 5% by weight of the batch. Such compatible metal oxides include $Na_2O$, $K_2O$, $B_2O_3$, $ZnO$, and $ZrO_2$. $Na_2O$, $K_2O$, and $B_2O_3$ act as fluxes in melting the batch. $ZnO$ and $ZrO_2$ act to stabilize the body against reducing conditions and to improve chemical durability. The presence of any of these materials must be kept low to avoid the formation of incompatible crystals and any deleterious effect upon the physical and visible properties of the glass-ceramic.

Although the melts described hereinafter are generally of low viscosity, a fining agent such as $As_2O_3$ or $Sb_2O_3$ may be included in the batch. Generally, no more than about 0.5–1.0% by weight is added and, since the residual amount remaining in the glass is too small to have any material effect on the fundamental properties of the glass, this component is not included in the following table of compositions.

Table I records glass compositions calculated from their respective batches to the oxide basis in weight percent, exclusive of impurities which may be present in the batch materials. The batch ingredients may comprise any materials, either oxides or other compounds which, on being melted together, are converted to the desired oxide composition in the required proportions.

In the following examples, the batches were compounded, wet ball milled to aid in obtaining a homogeneous melt, and then melted at about 1600° C. for about 16 hours in open crucibles, pots, or tanks depending upon the quantity of product desired. For testing purposes, cane of about ¼″ diameter was hand drawn. This cane was cut into 5½″ lengths and one end balled prior to heat treatment. The balled cane was placed in an electric-fired furnace and heated at about 5° C./minute to the first level of heat treatment, as set forth in Table II, and maintained thereat for a time sufficient to initiate nucleation. The furnace temperature was then raised at the same rate to the second level of heat treatment, as also recorded in Table II, and thereafter the electric power to the furnace was cut off and the furnace allowed to cool at room temperature with the balled cane contained within.

Table II also sets forth the moduli of rupture (p.s.i.) and coefficients of thermal expansion ($\times 10^{-7}$/° C.) of the semi-crystalline ceramic bodies as well as a description of each body and the crystal phase present, as determined by X-ray diffraction analyses. Although the physical properties and X-ray diffraction analyses were not obtained for each composition studied, each example represents a batch which was actually melted and heat treated to produce a glass-ceramic body. The modulus of rupture measurements were obtained following a conventional method using cane which had been previously abraded with a sand blast. The linear thermal coefficients of expansion were also measured in the conventional manner and the expressions set forth in Table II represent the average linear expansion coefficient between 0° C. and 300° C.

TABLE I

|  | 1 | 2 | 3 | 4 |
|---|---|---|---|---|
| BaO | 16.51 | 18.47 | 19.12 | 15.36 |
| MgO | 8.69 | 7.29 | 8.09 | 9.51 |
| $Al_2O_3$ | 18.3 | 18.42 | 16.96 | 17.5 |
| $SiO_2$ | 47.45 | 47.04 | 46.83 | 48.33 |
| $TiO_2$ | 8.61 | 8.42 | 8.58 | 8.85 |
| $Na_2O$ | 0.45 | 0.37 | 0.43 | 0.44 |

|  | 5 | 6 | 7 | 8 |
|---|---|---|---|---|
| BaO | 16.18 | 18.05 | 19.86 | 20.58 |
| MgO | 8.5 | 7.81 | 7.14 | 6.22 |
| $Al_2O_3$ | 18.64 | 18.34 | 18.06 | 19.14 |
| $SiO_2$ | 47.55 | 46.79 | 46.07 | 45.34 |
| $TiO_2$ | 8.71 | 8.57 | 8.44 | 8.30 |
| $Na_2O$ | 0.44 | 0.43 | 0.42 | 0.42 |

TABLE II

| No. | Heat Treat Schedule | Sample Description | Crystal Phases | Mod. of Rupture | Exp. Coef. |
|---|---|---|---|---|---|
| 1 | 800° C.-2 hrs / 1,150° C.-16 hrs | White, fine grained | | 34,300 | 66.2 |
|   | 800° C.-2 hrs / 1,050° C.-16 hrs | Light blue, fine grained | | 20,400 | 98.4 |
|   | 800° C.-2 hrs / 1,000° C.-16 hrs | Blue, fine grained | | 12,800 | 63.7 |
| 2 | 800° C.-2 hrs / 1,150° C.-16 hrs | White, fine grained | Hexacelsian magnesium dititanate | 31,200 | 70.4 |
|   | 800° C.-4 hrs / 1,150° C.-8 hrs | ----do---- | ----do---- | 33,100 | 67.8 |
|   | 800° C.-6 hrs / 1,150° C.-4 hrs | ----do---- | ----do---- | 32,600 | 68.2 |
|   | 800° C.-2 hrs / 1,000° C.-16 hrs | Blue, fine grained | ----do---- | 11,400 | 64.6 |

TABLE II.—Continued

| No. | Heat Treat Schedule | Sample Description | Crystal Phases | Mod. of Rupture | Exp. Coef. |
|---|---|---|---|---|---|
|  | 800° C.-2 hrs / 1,150° C.-16 hrs | Cream, fine grained | Hexacelsian magnesium dititanate unknown phase | 31,900 | 69.4 |
| 3 | 800° C.-2 hrs / 1,050° C.-16 hrs | Gray-white, fine grained | ----do---- | 15,300 | 118.6 |
|  | 800° C.-2 hrs / 1,100° C.-16 hrs | Cream, fine grained | ----do---- | 30,000 | 71.4 |
|  | 800° C.-2 hrs / 1,150° C.-16 hrs | ----do---- | ----do---- | 49,900 | 59.1 |
|  | 780° C.-4 hrs / 1,150° C.-12 hrs | ----do---- | ----do---- | 44,600 | 61.3 |
|  | 820° C.-6 hrs / 1,150° C.-2 hrs | ----do---- | ----do---- | 42,400 | 64.2 |
| 4 | 800° C.-2 hrs / 1,100° C.-16 hrs | White, fine grained | ----do---- | 30,060 | 70.6 |
|  | 800° C.-2 hrs / 1,125° C.-16 hrs | ----do---- | ----do---- | 46,600 | 62.5 |
|  | 800° C.-2 hrs / 1,000° C.-16 hrs | Light blue, fine grained | ----do---- | 12,600 | 59.6 |
| 5 | 800° C.-2 hrs / 1,150° C.-16 hrs | White, fine grained | ----do---- | 33,700 | 65.1 |
|  | 800° C.-2 hrs / 1,050° C.-16 hrs | Light blue, fine grained | ----do---- | 10,380 | 58.4 |
|  | 800° C.-2 hrs / 1,150° C.-16 hrs | Cream, fine grained | ----do---- | 45,200 | 70.1 |
|  | 800° C.-4 hrs / 1,125° C.-16 hrs | ----do---- | ----do---- | 41,500 |  |
| 6 | 800° C.-4 hrs / 1,175° C.-24 hrs | ----do---- | ----do---- | 40,400 | 68.3 |
|  | 800° C.-2 hrs / 1,050° C.-16 hrs | Light blue, fine grained | ----do---- | 19,600 | 90.6 |
|  | 800° C.-2 hrs / 1,150° C.-16 hrs | White, fine grained | Hexacelsian magnesium dititanate | 19,300 | 72.7 |
| 7 | 800° C.-4 hrs / 1,100° C.-16 hrs | ----do---- | ----do---- | 20,200 | 72.2 |
|  | 800° C.-6 hrs / 1,175° C.-16 hrs | ----do---- | ----do---- | 27,500 | 103.1 |
|  | 800° C.-2 hrs / 1,150° C.-16 hrs | ----do---- | ----do---- | 18,900 | 70.8 |
|  | 800° C.-2 hrs / 1,050° C.-16 hrs | Light blue, fine grained | ----do---- | 12,900 | 114.4 |
| 8 | 800° C.-6 hrs / 1,100° C.-24 hrs | Cream, fine grained | ----do---- | 14,300 |  |
|  | 800° C.-2 hrs / 1,125° C.-24 hrs | White, fine grained | ----do---- | 15,500 |  |
|  | 800° C.-2 hrs / 1,175° C.-16 hrs | Yellow white, fine grained | ----do---- | 16,200 | 51.6 |

The vital criticality of composition and heat treatment is dramatically illustrated in Tables I and II. The compositions of Examples 4 and 6 will give modulus of rupture measurements of over 40,000 p.s.i when suitably heat treated while the compositions of Examples 1, 2, 3, and 5, will give modulus of rupture measurements of over 30,000 p.s.i Yet, the closely related compositions of Examples 7 and 8 exhibit strengths far less than 30,000 p.s.i. even when extended heat treating times are employed. The tremendous effect which heat treating plays upon the strength and coefficient of thermal expansion of the resultant bodies is unmistakable. Thus, a final heat treating temperature of at least about 1110° C. is demanded to assure the desired high strength. At above 1175° C., the prime effect on strength has been exceeded and, often, the coefficient of thermal expansion is raised to such an extent as to render the product unuseable.

However, where the composition of the glass body and the heat treatment of the glass body are held within the strict limits set out hereinabove, a glass-ceramic capable of giving excellent service as institutional dinnerware can be obtained. Such glass-ceramic body readily accepts and retains a wide variety of decorative materials and glazes, and exhibits very adequate resistance to detergent attack and staining by foods. The crystal content of these semicrystalline articles has been determined to be at least about 30 weight percent, but is generally in the vicinity of 50 weight percent, and is preferably even higher. This characteristic is dependent upon the extent to which the batch components are adaptable to the formation of crystal phases. The crystals, themselves, are very fine grained, i.e., substantially all finer than about 30 microns in diameter, and are randomly dispersed throughout the glassy matrix. The texture created by this dispersion of fine-grained crystals in a glassy matrix yields a body quite similar in appearance and feel to fine china.

Although hand-drawn cane was described in connection with each of the above examples, it will be understood that any of the conventional glass-forming methods such as blowing, casting, pressing, rolling, or spinning is also applicable.

Figure 1:
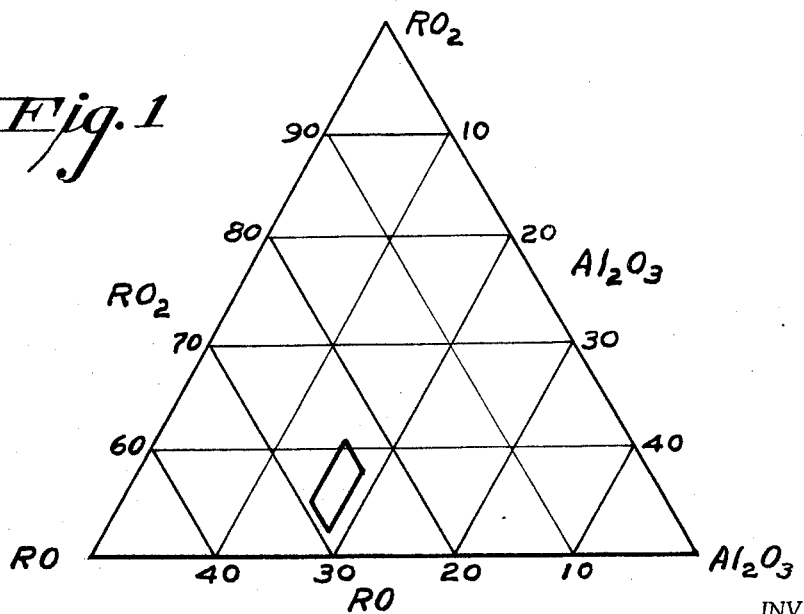

FIG. 1 illustrates the ranges of glass compositions encompassed in our invention. Although these compositions actually include five constituents, for convenience in representation, the BaO and MgO have been combined as RO and the $SiO_2$ and $TiO_2$ as $RO_2$.

FIG. 2 sets forth a time-temperature curve for the heat treating schedule of Example 4, yielding the highest modulus of rupture measurement coupled with a low coefficient of thermal expansion. After the batch had been melted in an open crucible at 1600° C. for about 16 hours, cane hand drawn and cooled to room temperature, the glass cane was given the following heat treatment: the temperature was raised at 5° C./minute to 800° C., maintained thereat for 2 hours, thereafter the temperature was raised at 5° C./minute to 1150° C., maintained thereat for 16 hours, after which the heat to the furnace was cut off and the furnace allowed to cool to room temperature with the cane therein. It will be appreciated that this cooling rate was not linear but was more rapid at higher temperatures. Nevertheless, for convenience in completing the curve, an average cooling rate of 5° C./minute has been selected. The areas enclosed within the dotted lines represent the ranges of times and temperatures of our preferred two-step heat treating process.

What is claimed is:

1. In the method for manufacturing a glass-ceramic body possessing a modulus of at least about 30,000 p.s.i. and a linear coefficient of thermal expansion of not more than about $70 \times 10^{-7}$° C., the improvement which consists in melting a glass-forming composition consisting essentially, by weight on the oxide basis, of 16–19.5% BaO, 7–10% MgO, 16.5–19% $Al_2O_3$, 46–49% $SiO_2$, and 6–12% $TiO_2$, the total of said BaO, MgO, $Al_2O_3$, $SiO_2$ and $TiO_2$ constituting at least 95% by weight of said glass, simultaneously cooling the melt below the transformation point of said melt and forming a glass shape therefrom, thereafter heating said glass shape to a temperature of at least about 1100° C., but not more than about 1175° C., for a time sufficient to obtain crystallization consisting essentially of hexacelsian and magnesium dititanate, and then cooling the crystallized shape to room temperature.

2. A method according to claim 1 wherein the time sufficient to obtain crystallization of hexacelsian and magnesium dititanate ranges from about 2–24 hours.

References Cited by the Examiner
UNITED STATES PATENTS

| | | | |
|---|---|---|---|
| 2,920,971 | 1/1960 | Stookey | 65—33 X |
| 3,201,266 | 8/1965 | MacDowell | 106—52 |

DONALL H. SYLVESTER, *Primary Examiner.*

G. R. MYERS, *Assistant Examiner.*